Patented Dec. 2, 1952

2,620,278

UNITED STATES PATENT OFFICE 2,620,278

PROCEDURE IN MAKING AND PRESERVING JUICES OF FRUIT AND OTHER VEGETABLES

Hilppa Pirhonen, Mustiala, Finland

No Drawing. Application July 30, 1947, Serial No. 764,904. In Finland February 19, 1942

Section 1, Public Law 690, August 8, 1946
Patent expires February 19, 1961

7 Claims. (Cl. 99—155)

Juices of fruit and other vegetables are usually made by mechanically squeezing out the juice contained in the fruit or other vegetable. In the juice thus produced a certain quantity of domestic sugar is dissolved or an aqueous sugar solution is added to the juice. The object of this is to sweeten the juice and to preserve it. Another procedure also used is that a sugar solution of a certain concentration is poured over the uncrushed fruit, for instance, berries. With the aid of osmose the juice has then been extracted through the skin of the fruit into the sugar solution. The osmotic pressure depends on the concentration of the sugar solution and on the quality of the sugar. The tenability of the juice extracted from the fruit also depends on these last mentioned circumstances.

The object of the present invention is to separate the juice from the fruit and other vegetables as completely as possible through osmose by using a sugar solution, which makes the manifestation of life of bacteria and microbes generally impossible. The fundamental idea of the invention is that a cooled acid invert sugar solution, the redoxpotential of which is so low that no oxidation or bacterial action generally is possible, is used to increase the osmose and to obtain an increased yield of juice by inserting the fruit in such a sugar solution.

The greater the osmotic pressure is in a sugar solution the more completely is the juice in the fruit extracted through the skin. The osmotic pressure in ordinary sugar is doubled if the sugar is inverted. The diffusibility of the juice of fruits or vegetables depends on the degree of inversion. If the diffusion is incomplete the juice turns out too sacchariferous and tastes too sweet, the charactheristic taste of the juice disappears and the sugar crystallises in a thick layer on the bottom of the container.

The invert sugar is made of ordinary sugar by heating it with some acid in water. For this purpose many different acids, inorganic and organic, can be used. Hydrochloric acid has proved very good but better results have been achieved by using oxiacids, either singly or together with others. Of these acids tartaric acid and citric acid may be specially mentioned, and of these the latter is likely the most suitable as it does not cause injurious ions in the organism. Invert sugar can, for instance, be made by mixing 5 kg. crystal sugar, 50 gr. citric acid and 2¼ l. water and heating the solution under constant stirring until the temperature of it reaches 90° C. The container is then put to cool, after which the solution is ready for use.

The redoxpotential of the invert sugar should then be 330–360 mv. and can be determined with the use of a potentiometer and the use of a platinum electrode and concentrated KCl-kalomedelectrode.

The making of the juice can be carried out as follows: The raw material for the juice, the cleaned berries or fruit, are put fresh into, for instance, a container of glass, china or enamel, and the solution of invert sugar, prepared according to the instructions on the packets of acids, is poured over them. A weight, for instance a plate or a clean stone, is put on the berries so that the solution completely covers them. The container is then stored in a cool and dry place. Then the juice is extracted from the berries or fruits by the osmotic pressure. After a month or two the ready juice can be drawn and bottled and stored in a cool place for several years without pasteurizing or sealing of the bottles. The berries remaining after the juice has been drawn can be made into marmalade or otherwise used in the household.

The juice made in this way has a fully natural taste, a strong aroma and keeps well.

The preserving effect of this kind of inverted sugar is the result of three factors i. e. the doubled osmotic pressure, the low redoxpotential and the degree of acidity. The tenability of the juice is also so great that there is no need for complete sterilisation of the bottles before filling and that, after the bottle has been opened for use of the contents, it does not even need to be properly closed again. A specially important advantage with the procedure in question is, that, when using the above described solution of invert sugar, no mechanical appliances for squeezing are necessary.

I claim:

1. A process for preparing juices from fruits comprising the steps of preparing an invert sugar solution which is at room temperature; immersing the fruits from which the juice is to be prepared into the thus prepared sugar solution at room temperature, so that the juice of the fruits is drawn by osmosis into the invert sugar solution; and allowing the thus immersed fruits to remain in the invert sugar solution at room temperature until substantially all of the juice has been drawn therefrom.

2. A process for preparing juices from fruits comprising the steps of preparing an invert sugar solution which is at room temperature; immersing the fruits from which the juice is to be prepared into the thus prepared sugar solution at room temperature, so that the juice of the fruits is drawn by osmosis into the invert sugar solution; and allowing the thus immersed fruits to remain for over one month in the invert sugar solution at room temperature until substantially all of the juice has been drawn therefrom.

3. A process for preparing juices from fruits comprising the steps of preparing an invert sugar solution which comprises sugar and acid mixed in water and which is at room temperature; immersing the fruits from which the juice is to be prepared into the thus prepared sugar solution at room temperature, so that the juice of the fruits is drawn by osmosis into the invert sugar solution; and allowing the thus immersed fruits to remain for over one month in the invert sugar solution at room temperature until substantially all of the juice has been drawn therefrom.

4. A process for preparing juices from fruits comprising the steps of preparing an invert sugar solution which comprises sugar and citric acid mixed in water and which is at room temperature; immersing the fruits from which the juice is to be prepared into the thus prepared sugar solution at room temperature, so that the juice of the fruits is drawn by osmosis into the invert sugar solution; and allowing the thus immersed fruits to remain for over one month in the invert sugar solution at room temperature until substantially all of the juice has been drawn therefrom.

5. A process for preparing juices from fruits comprising the steps of preparing a solution by mixing sugar and acid in water; heating the thus prepared solution up to a temperature which is below the boiling temperature of the solution; allowing the thus heated solution to cool to room temperature; and immersing the fruits from which the juice is to be prepared into the thus prepared invert sugar solution at room temperature, so that the juice of the fruits is drawn by osmosis into the invert sugar solution.

6. A process for preparing juices from fruits comprising the steps of preparing a solution by mixing sugar and acid in water; heating the thus prepared solution up to a temperature of approximately 90° C.; constantly stirring the thus prepared solution while it is being heated; allowing the thus heated solution to cool to room temperature; immersing the fruits from which the juice is to be prepared into the thus prepared invert sugar solution at room temperature, so that the juice of the fruits is drawn by osmosis into the invert sugar solution; and allowing the thus immersed fruits to remain in the invert sugar solution at room temperature until substantially all of the juice has been drawn therefrom.

7. A process for preparing juices from fruits comprising the steps of preparing a solution by mixing sugar and acid in water; heating the thus prepared solution up to a temperature of approximately 90° C.; constantly stirring the thus prepared solution while it is being heated; allowing the thus heated solution to cool to room temperature; immersing the fruits from which the juice is to be prepared into the thus prepared invert sugar solution at room temperature, so that the juice of the fruits is drawn by osmosis into the invert sugar solution; and allowing the thus immersed fruits to remain for over one month in the invert sugar solution at room temperature until substantially all of the juice has been drawn therefrom.

HILPPA PIRHONEN.

REFERENCES CITED

The following references are of record in the file of this patent:

UNITED STATES PATENTS

| Number | Name | Date |
| --- | --- | --- |
| 1,009,325 | Lodge | Nov. 21, 1911 |
| 1,393,422 | Berridge | Oct. 11, 1921 |

OTHER REFERENCES

Leach, Food Inspection and Analysis, page 1005, John Wiley & Sons, New York, 1920, 4th ed.